C. H. PAARMANN.
MILKING MACHINE.
APPLICATION FILED SEPT. 12, 1916.
1,276,803.
Patented Aug. 27, 1918.
2 SHEETS—SHEET 1.
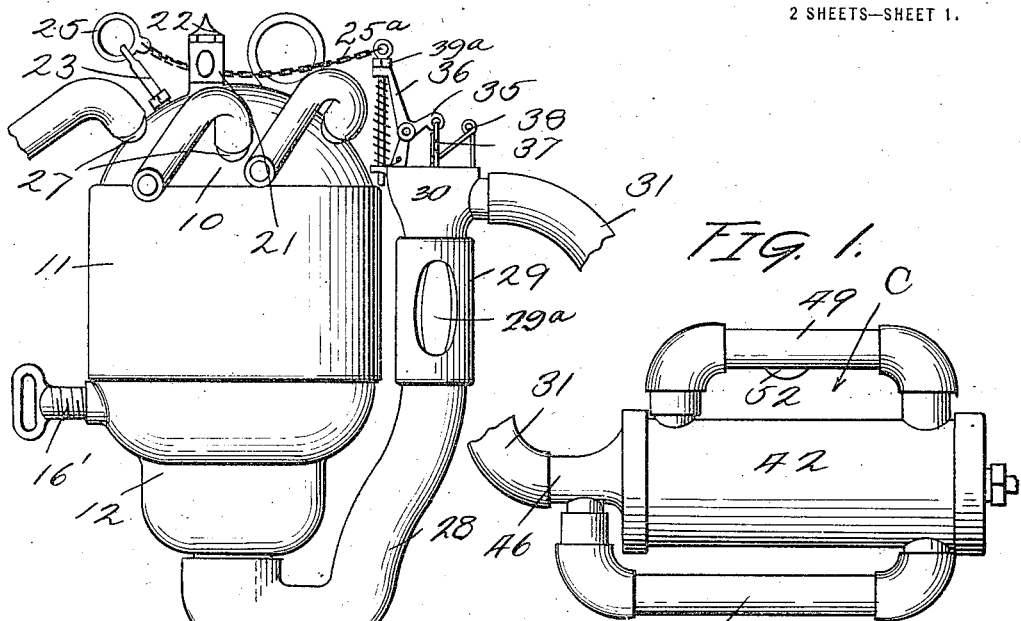
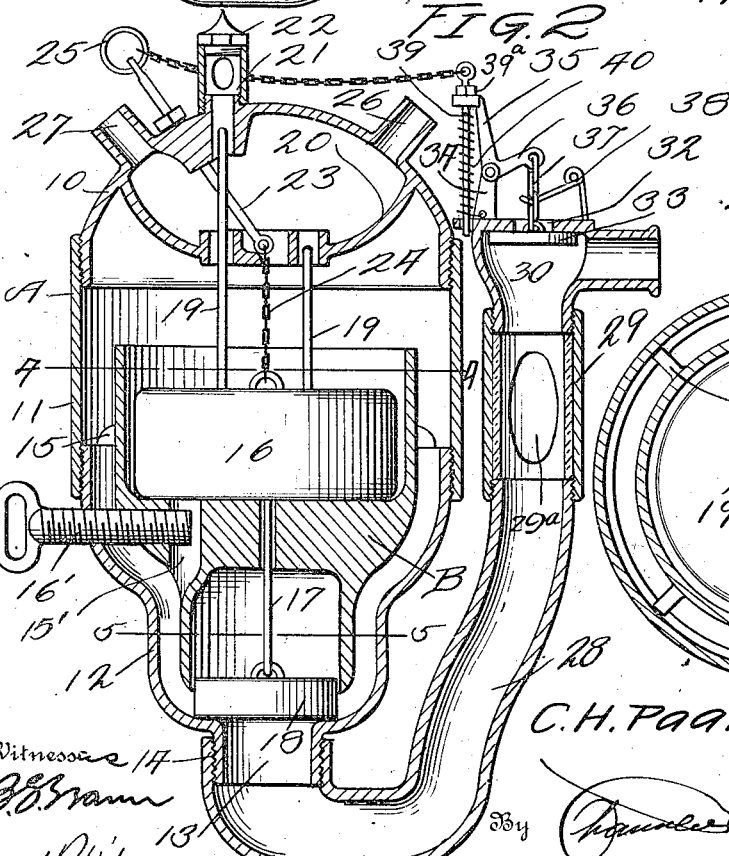
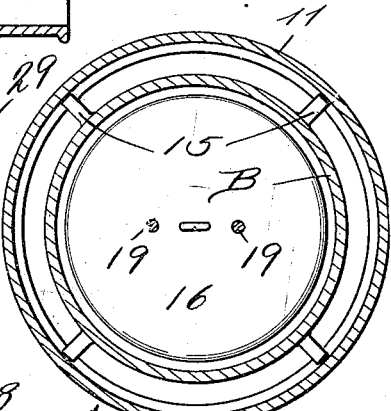
Inventor
C. H. Paarmann

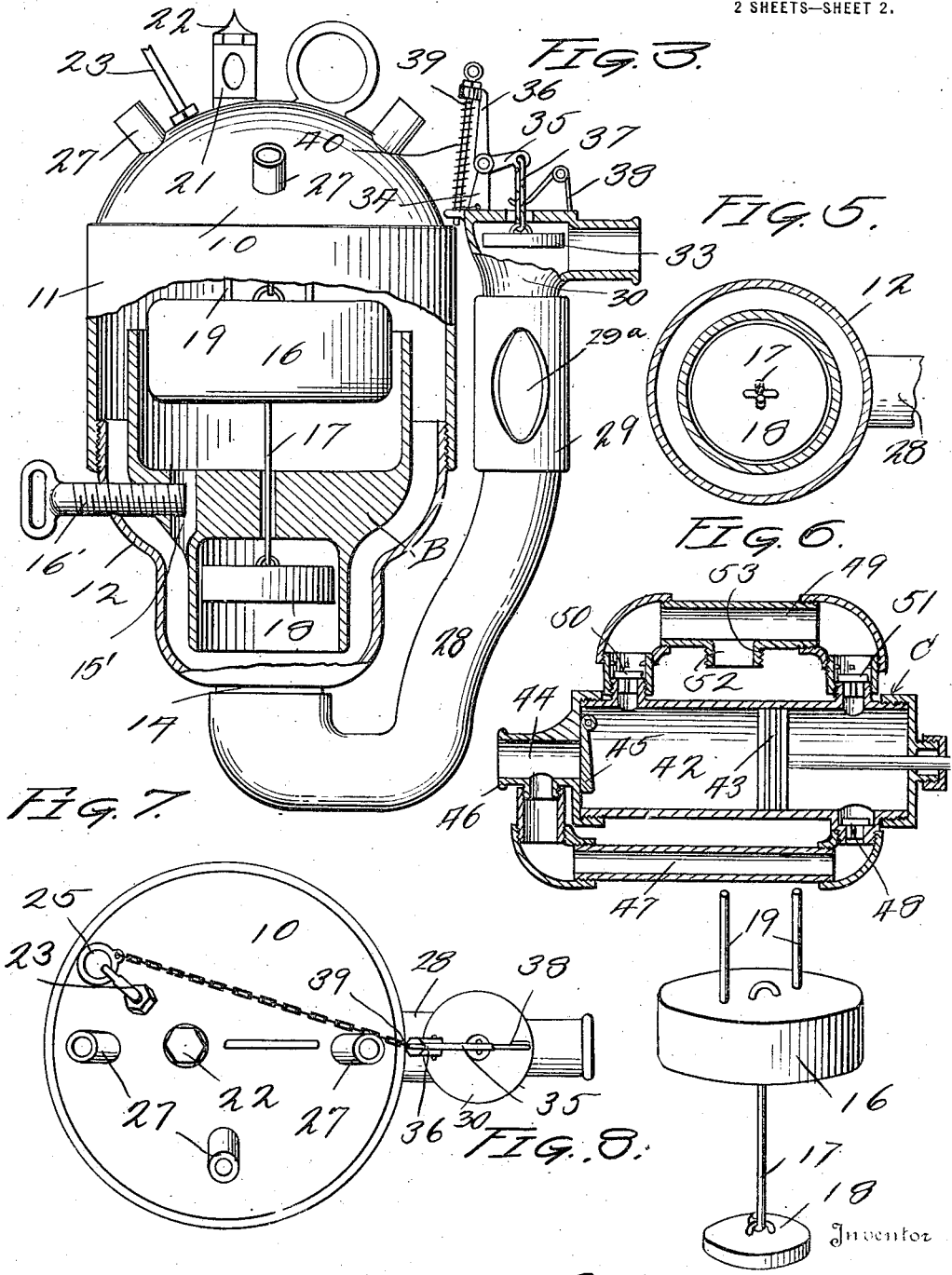

UNITED STATES PATENT OFFICE.

CARL H. PAARMANN, OF DELMAR, IOWA.

MILKING-MACHINE.

1,276,803.

Specification of Letters Patent.

Patented Aug. 27, 1918.

Application filed September 12, 1916. Serial No. 119,730.

*To all whom it may concern:*

Be it known that I, CARL H. PAARMANN, a citizen of the United States, residing at Delmar, in the county of Clinton, State of Iowa, have invented certain new and useful Improvements in Milking-Machines; and I do hereby declare the following to be a full, clear, and exact description of the invention, such as will enable others skilled in the art to which it appertains to make and use the same.

This invention relates to milking machines.

The object of the invention is to provide a milking machine embodying an improved construction whereby the stoppage of the flow of milk will cause the machine to become ineffective as to further milking action and thereby prevent injury to the animal.

A further object of the invention is to provide a milking machine which will obviate the necessity of finishing the milking operation by hand and which is simple in construction, efficient, readily taken apart for cleaning or other purposes, easily assembled, and well adapted to meet the requirements of a practical machine.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of the improved milking machine also disclosing the pump of the apparatus.

Fig. 2, a vertical section of the vacuum case with the parts in the position they would occupy before the milking operation is instituted.

Fig. 3, a view similar to Fig. 2 with the parts in the position they would occupy during the milking operation.

Fig. 4, a section on the line 4—4 of Fig. 2.

Fig. 5, a section on the line 5—5 of Fig. 2.

Fig. 6, a vertical section through the pump of the apparatus.

Fig. 7, a plan view of the vacuum case, and

Fig. 8, a perspective view of the float and valve.

Referring to the drawing the improved milking machine is shown as comprising a vacuum case A which includes a top section 10, an intermediate section 11, and a bottom section 12, the latter being provided with an opening 13 around which is formed a threaded nipple 14. Disposed within the casing A is a float and valve guide B, said guide being removable from the case and having lateral lugs 15 which engage the upper edge of the bottom section 12 for the purpose of supporting the guide in correct position within the case A. Disposed within the guide B is a float 16 from which depends a rod 17 which carries on its lower end a valve 18 adapted to close the opening 13 when the float 16 is in its lowermost position. Rising from the float 16 are rods 19 both of which are loosely passed through in a dished partition 20 formed in the upper portion of the top section 10. One of the rods is extended and slidably engaged through an opening in the top section around which is built up a tubular extension 21 closed by a cap 22. These rods 19 serve to hold the float 16 against axial rotation as will be obvious. Slidably mounted in the top section 10 is a rod 23 the inner end of which is connected to the float 16 by a chain 24. The outer end of the rod 23 carries a ring 25 for convenience in sliding the rod outwardly to lift the float 16 and of course the valve 18. A vertical post 15′ providing communication between the bottom of the float chamber B and the section 12 is adapted to be adjustably contracted by an adjusting screw 16′ entered through the walls of the section 12 and the chamber B.

The top section 10 is provided with a plurality of openings 26 around which are formed on the outer side of the section 10 nipples 27 and over these nipples are adapted to be engaged pipes leading from suitable teat cups. Engaged on the nipple 14 is one end of a suction pipe 28. This pipe includes a section 29 provided with a sight glass 29ᵃ and further includes an angle terminal, one arm of which is engaged with the section 29 while the other arm is adapted to be connected with a suction pump C through the medium of a pipe 31. The terminal 30 is provided with an opening 32 adapted to be covered and uncovered by a valve 33 disposed within the terminal 30. Mounted on the exterior of the terminal 30 is a bracket 34 which has pivoted thereon an angle lever including arms 35 and 36, the latter of which is connected to the valve 33 by a chain 37. This valve 33 is normally held closed by a spring 38 mounted on the terminal 30.

Passed through the lateral extension on the upper end of the arm 35 is an eye bolt 39, which has its lower end passed through a flange of the terminal 30. A retractile spring 40 is secured to said bolt adjacent its upper end and to the terminal 30, the tension of this spring being adjusted by a nut 39ª threaded on the eye bolt above the lateral extension and bearing thereagainst. A chain 25ª connects the ring 25 of the valve lifting rod with the eye of the bolt 39 to close the valve upon manual raising of the float 16.

In some cases the spring 38 is not strong enough to hold the valve 33 closed to effect thorough milking and in such instances the spring 40 is adjusted sufficiently to reach the end desired, said spring 40 being considerably stronger than the spring 38.

The pump C is of the double action type and includes a cylinder 42 in which is slidable a piston 43. One end of the cylinder 42 is provided with an opening 44 closed by an inwardly opening valve 45 and surrounded by a nipple 46 to which is connected one end of the pipe 31. The opening 44 is connected with the opposite end of the cylinder 44 by a by-pass 47 and the end of the by-pass 47 remote from the opening 44 is controlled by an inwardly opening check valve 48. Opposite ends of the cylinder 42 are also connected by a by-pass 49 the end of which that is disposed adjacent the passage 44 is controlled by an outwardly opening check valve 50, while the opposite end of the by-pass 49 is controlled by an outwardly opening check valve 51. The by-pass 49 is provided intermediate its ends with a discharge opening 52 surrounded by a threaded nipple 53 on which is engaged a pipe 54 leading to a suitable receptacle (not shown).

In the operation of the device same is applied in the necessary and well known manner and the actuation of the pump C instituted. At this time the valve 18 is of course in closed position and therefore no milking operation will be performed, the valve 33 responding to the suction pump to admit air and relieve the vacuum caused by the operation of the pump. To institute the operation of milking the rod 23 is moved outwardly and the float 16 and valve 18 elevated. The suction of the pump will now be transferred to the interior of the case A and from there to the teat cups. The milk flowing into the case A will now sustain the float 16 elevated and the valve 18 open. The rod 23 is now returned to its original position and the operation continued with. When the flow of milk ceases the float 16 will fall and the valve 18 will close when the pump again becomes ineffective with respect to the interior of the case and injury to the animal be prevented.

The milk drawn in by the pump C on one stroke of the piston 43 passes by the valve 45 and on the opposite stroke of said piston this milk is forced by the valve 50 and through the by-pass 49 and is discharged through the opening 52. On the stroke of the piston 43 in the direction of the valve 45 milk is drawn into the cylinder by way of the by-pass 47 and on the reverse stroke of said piston the accumulated milk in the cylinder is forced by the valve 51 and through the by-pass 49, being discharged from the latter through the opening 52.

The float 16 falls rapidly or slowly in accordance with the rate of flow of the milk from the float chamber B through the port 15', and since the latter is controlled by the screw 16', the stopping of the apparatus can be accurately timed.

What is claimed is:—

A milking apparatus including a vacuum casing having ports in its upper portion for connection with teat engaging members, a vacuum conduit in communication with said casing, a valve for closing said conduit, a chamber in the casing adapted to receive discharge of milk from the ports and having an outlet, a float in the chamber and connected with the valve for operating same, and means for varying flow of milk through said port.

In testimony whereof, I affix my signature, in the presence of two witnesses.

CARL H. PAARMANN.

Witnesses:
    J. C. SPENCER,
    A. J. WING.